United States Patent
Yin et al.

(10) Patent No.: US 9,967,863 B2
(45) Date of Patent: May 8, 2018

(54) SYSTEMS AND METHODS FOR UPLINK CONTROL INFORMATION REPORTING WITH LICENSE-ASSISTED ACCESS (LAA) UPLINK TRANSMISSIONS

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days. days.

(21) Appl. No.: 15/466,647

(22) Filed: Mar. 22, 2017

(65) Prior Publication Data
US 2017/0280430 A1    Sep. 28, 2017

Related U.S. Application Data

(60) Provisional application No. 62/312,778, filed on Mar. 24, 2016.

(51) Int. Cl.
*H04W 72/04* (2009.01)
*H04L 1/18* (2006.01)
(Continued)

(52) U.S. Cl.
CPC ....... *H04W 72/0406* (2013.01); *H04L 1/1812* (2013.01); *H04L 5/0055* (2013.01);
(Continued)

(58) Field of Classification Search
CPC ............ H04W 72/04; H04W 72/0406; H04W 72/1289; H04W 76/02; H04W 76/026;
(Continued)

(56) References Cited

U.S. PATENT DOCUMENTS

2012/0250631 A1    10/2012    Hakola et al.
2014/0362780 A1    12/2014    Malladi et al.
(Continued)

FOREIGN PATENT DOCUMENTS

WO    2015042396 A1    3/2015
WO    2015050743 A1    4/2015
(Continued)

OTHER PUBLICATIONS

ZTE, "Discussion on PUCCH for LAA UL", 3GPP TSG RAN WG1 Meeting #84, St. Julian's, Malta, R1-160334, Feb. 19, 2016.
(Continued)

*Primary Examiner* — Jenee Holland
(74) *Attorney, Agent, or Firm* — Austin Rapp

(57) ABSTRACT

A user equipment (UE) is described that includes a processor. The UE is configured with a secondary cell group (SCG). The UE is also configured with a licensed-assisted access (LAA) serving cell as a primary secondary cell (pSCell) of the SCG. The UE receives a physical downlink shared channel (PDSCH) on at least one LAA serving cell in the SCG. The UE determines a channel to carry uplink control information (UCI), the channel being on any one of the serving cell(s) in the SCG. The UE also determines transmission timing of the channel based on reception timing of the PDSCH. The UE further determines one or more PDSCHs of which HARQ-ACK bits are included in the UCI, the one or more PDSCHs including the PDSCH. The UE additionally determines content of the HARQ-ACK bits. The UE also performs a channel access procedure for the transmission of the channel.

20 Claims, 13 Drawing Sheets

(51) Int. Cl.
  *H04L 5/00* (2006.01)
  *H04W 72/12* (2009.01)
  *H04W 88/02* (2009.01)
  *H04W 76/02* (2009.01)
(52) U.S. Cl.
  CPC ..... *H04W 72/1289* (2013.01); *H04W 76/026* (2013.01); *H04W 88/02* (2013.01)
(58) Field of Classification Search
  CPC ........ H04W 88/02; H04L 1/18; H04L 1/1812; H04L 5/0048; H04L 5/0055
  See application file for complete search history.

(56) References Cited

U.S. PATENT DOCUMENTS

| | | | |
|---|---|---|---|
| 2015/0049712 A1 | 2/2015 | Chen et al. | |
| 2015/0172950 A1 | 6/2015 | Chen et al. | |
| 2015/0215930 A1* | 7/2015 | Kim | H04W 52/0212 370/329 |
| 2015/0327243 A1 | 11/2015 | Yin et al. | |
| 2015/0365931 A1* | 12/2015 | Ng | H04L 1/1812 370/329 |
| 2016/0105907 A1* | 4/2016 | Lee | H04W 16/14 370/336 |
| 2016/0135143 A1* | 5/2016 | Won | H04W 72/005 370/312 |
| 2016/0182204 A1* | 6/2016 | Hsieh | H04L 5/0055 370/329 |
| 2016/0262118 A1* | 9/2016 | Kim | H04W 52/365 |
| 2016/0278074 A1* | 9/2016 | Yang | H04L 1/1812 |
| 2016/0309464 A1* | 10/2016 | Mukherjee | H04W 28/06 |

FOREIGN PATENT DOCUMENTS

| | | |
|---|---|---|
| WO | 2015116503 A1 | 8/2015 |
| WO | 2015131806 A1 | 9/2015 |
| WO | 2016021945 A1 | 2/2016 |

OTHER PUBLICATIONS

CATT, "Support of PUCCH for LAA Scell", 3GPP TSG RAN WG1 Meeting #84, St. Julian's, Malta, R1-160357, Feb. 19, 2016.
NEC, "Discussion on PUCCH enhancement for LAA", 3GPP TSG RAN WG1 Meeting #84, St. Julian's, Malta, R1-160391, Feb. 19, 2016.
Intel Corporation, "On the need to support PUCCH for eLAA", 3GPP TSG RAN WG1 Meeting #84, St. Julian's, Malta, R1-160422, Feb. 19, 2016.
CMCC, "Discussion on uplink control signalling transmission for LAA", 3GPP TSG RAN WG1 Meeting #84, St. Julian's, Malta, R1-160496, Feb. 19, 2016.
Samsung, "Discussion on PUCCH for UL LAA", 3GPP TSG RAN WG1 Meeting #84, St. Julian's, Malta, R1-160563, Feb. 19, 2016.
Oppo, "PUCCH transmission on eLAA carrier", 3GPP TSG RAN WG1 Meeting #84, St. Julian's, Malta, R1-160594, Feb. 19, 2016.
Oppo, "HARQ-ACK transmission on eLAA carrier", 3GPP TSG RAN WG1 Meeting #84, St. Julian's, Malta, R1-160595, Feb. 19, 2016.
LG Electronics, "PUCCH transmission in LAA", 3GPP TSG RAN WG1 Meeting #84, St. Julian's, Malta, R1-160627, Feb. 19, 2016.
Huawei, HiSilicon, "UCI transmission for eLAA", 3GPP TSG RAN WG1 Meeting #84, St. Julian's, Malta, R1-160747, Feb. 19, 2016.
Nokia Networks, Alcatel-Lucent, Alcatel-Lucent Shanghai Bell, "On the need for PUCCH in eLAA", 3GPP TSG RAN WG1 Meeting #84, St. Julian's, Malta, R1-160777, Feb. 19, 2016.
Qualcomm Incorporated, "PUCCH design details", 3GPP TSG RAN WG1 Meeting #84, St. Julian's, Malta, R1-160888, Feb. 19, 2016.
NTT Docomo, Inc., "Discussion on UCI transmission and PUCCH design for eLAA UL", 3GPP TSG RAN WG1 Meeting #84, St. Julian's, Malta, R1-160949, Feb. 19, 2016.
Ericsson, "PUCCH Design for Enhanced LAA", 3GPP TSG RAN WG1 Meeting #84, St. Julian's, Malta, R1-160998, Feb. 19, 2016.
Lenovo, "Necessity of PUCCH transmission on LAA SCell", 3GPP TSG RAN WG1 Meeting #84, St. Julian's, Malta, R1-161010, Feb. 19, 2016.
InterDigital Communications, "On PUCCH for eLAA", 3GPP TSG RAN WG1 Meeting #84, St. Julian's, Malta, R1-161083, Feb. 19, 2016.
MediaTek Inc., "Considerations on PUCCH for LAA", 3GPP TSG RAN WG1 Meeting #84, St. Julian's, Malta, R1-160974, Feb. 19, 2016.
International Search Report and Written Opinion issued for PCT Application No. PCT/US2017/023812 dated May 29, 2017.
Kyocera, "Further considerations on the essential functionalities for LAA", 3GPP TSG RAN WG1 Meeting #79, San Francisco, California, USA, R1-144955, Nov. 21, 2014.
3GPP TS 36.300 V13.3.0, Evolved Universal Terrestrial Radio Access (E-UTRA) and Evolved Universal Terrestrial Radio Access Network (E-UTRAN); Overall description; Stage 2, (Release 13) Mar. 2016.

\* cited by examiner

SYSTEMS AND METHODS FOR UPLINK CONTROL INFORMATION REPORTING WITH LICENSE-ASSISTED ACCESS (LAA) UPLINK TRANSMISSIONS

RELATED APPLICATIONS

This application is related to and claims priority from U.S. Provisional Patent Application No. 62/312,778, titled "SYSTEMS AND METHODS FOR UPLINK CONTROL INFORMATION REPORTING WITH LICENSE-ASSISTED ACCESS (LAA) UPLINK TRANSMISSIONS," filed on Mar. 24, 2016, which is hereby incorporated by reference herein, in its entirety.

TECHNICAL FIELD

The present disclosure relates generally to communication systems. More specifically, the present disclosure relates to systems and methods for uplink control information (UCI) reporting with licensed-assisted access (LAA) uplink transmissions.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
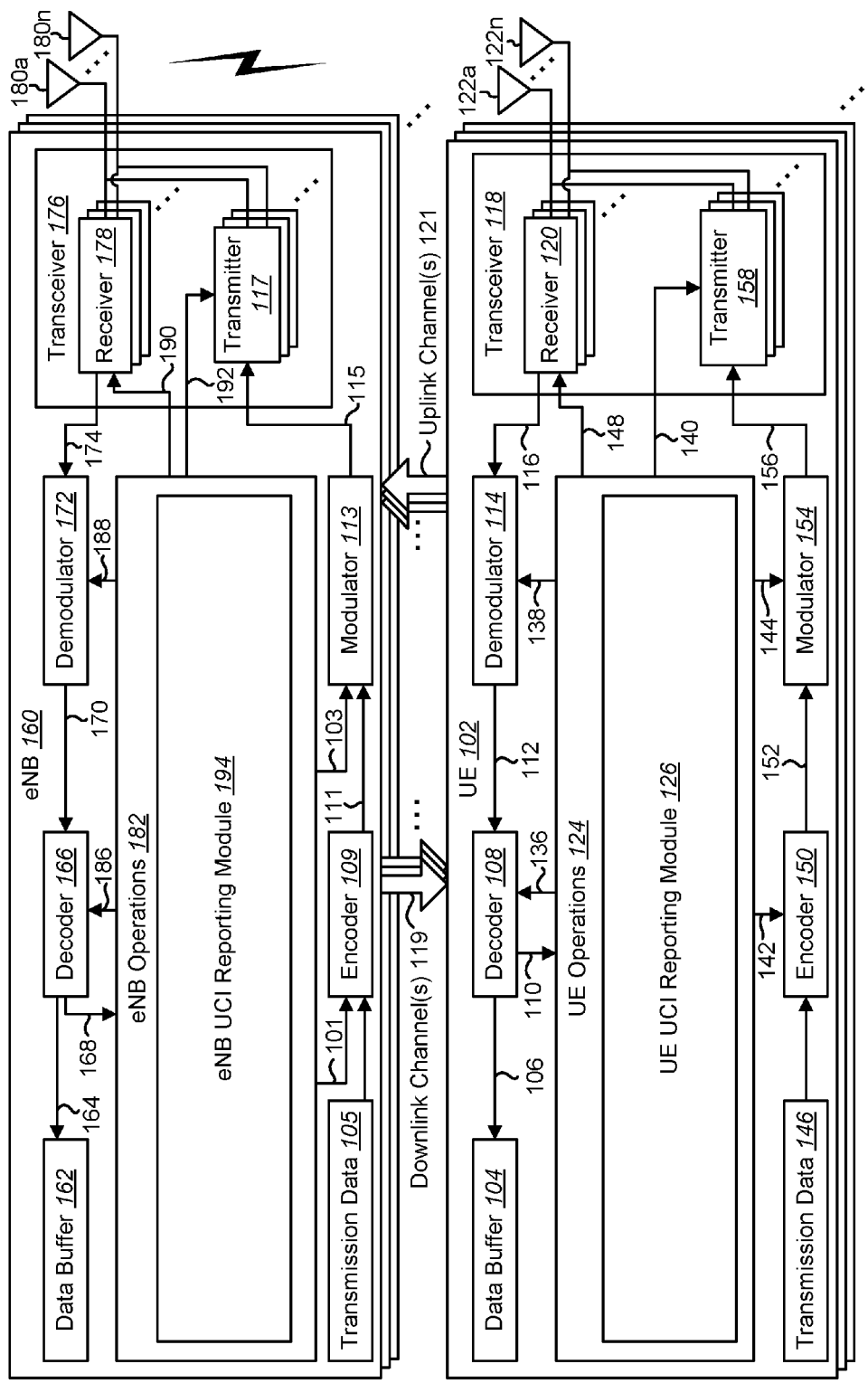
FIG. 1 is a block diagram illustrating one implementation of one or more evolved Node Bs (eNBs) and one or more user equipments (UEs) in which systems and methods for reporting uplink control information (UCI) with licensed-assisted access (LAA) may be implemented.

A user equipment (UE) is described that includes a processor and memory in electronic communication with the processor. The instructions are executable to configure the UE with a secondary cell group (SCG). The instructions are also executable to configure the UE with a licensed-assisted access (LAA) serving cell as a primary secondary cell (pSCell) of the SCG. The instructions are also executable to receive a physical downlink shared channel (PDSCH) on at least one LAA serving cell in the SCG. The instructions are also executable to determine a channel to carry uplink control information (UCI), the channel being on a serving cell in the SCG. The instructions are also executable to determine transmission timing of the channel based on reception timing of the received PDSCH. The instructions are also executable to determine one or more PDSCHs of which hybrid automatic repeat request acknowledgment (HARQ-ACK) bits are included in the UCI, the one or more PDSCHs including the received PDSCH. The instructions are also executable to determine content of the HARQ-ACK bits. The instructions are also executable to perform a channel access procedure for transmission of the channel.

When at least one PDSCH is received on at least one LAA serving cell in the SCG with an LAA cell as the pSCell, the instructions executable to determine the channel to carry the UCI may include instructions executable to determine a licensed cell is used for UCI reporting if a UCI of both licensed and LAA cells needs to be reported, and to determine the LAA cell is used for UCI reporting if a UCI of only LAA cells of the SCG needs to be reported.

If only LAA cells of the SCG need to be reported in a subframe, then the instructions may be further executable to determine the licensed cell is used for UCI reporting if the LAA PDSCH is cross-carrier scheduled from the licensed cell, and to determine the LAA cell is used for UCI reporting if the LAA PDSCH is self-scheduled or cross-carrier scheduled from another LAA cell in the same cell group (CG).

When at least one PDSCH is received on at least one LAA serving cell in the SCG with an LAA cell as the pSCell, the instructions may be further executable to determine transmission timing for HARQ-ACK feedback for the LAA PDSCH. The instructions executable to determine the transmission timing for the HARQ-ACK feedback for the LAA PDSCH may include instructions executable to determine a starting subframe where the HARQ-ACK feedback of the received PDSCH can be reported, and determine a set of subframes where the HARQ-ACK feedback of the received PDSCH can be reported.

The instructions executable to determine the transmission timing for the HARQ-ACK feedback for the LAA PDSCH may include instructions executable to determine the starting subframe and the set of subframes allowed for UCI transmission by a fixed value or higher layer signaling.

The instructions executable to determine the transmission timing for the HARQ-ACK feedback for the LAA PDSCH may include instructions executable to determine the starting subframe and the set of subframes allowed for UCI transmission by a downlink scheduling downlink control information (DCI).

The instructions may be further executable to determine content of HARQ-ACK feedback for the LAA PDSCH in a potential uplink (UL) LAA UCI reporting subframe. The HARQ-ACK feedback of each LAA downlink (DL) subframe may be generated and reported independently following a determined transmission timing and range.

The instructions may be further executable to determine content of HARQ-ACK feedback for the LAA PDSCH in a potential uplink (UL) LAA UCI reporting subframe. The HARQ-ACK feedback of each LAA downlink (DL) subframe may be generated and aggregated together in a single HARQ-ACK report based on a determined transmission timing and range.

The instructions may be further executable to determine content of HARQ-ACK feedback for the LAA PDSCH in a potential uplink (UL) LAA UCI reporting subframe. The HARQ-ACK feedback of a set of LAA downlink (DL) subframes may be generated and aggregated together and associated with a single UCI transmission start time and range.

The instructions may be further executable to determine timing and content of HARQ-ACK feedback for the LAA PDSCH in a potential uplink (UL) LAA UCI reporting subframe. The HARQ-ACK feedback may be initiated after a fixed or predefined association timing if at least one PDSCH is received on the LAA cell. The HARQ-ACK of all HARQ-ACK processes may be reported in a UCI transmission subject to the channel access procedure.

A method for uplink control information (UCI) reporting with license-assisted access (LAA) uplink transmissions is also described. The method is implemented by a user equipment (UE). The method includes configuring the UE with a secondary cell group (SCG). The method also includes configuring the UE with an LAA serving cell as a primary secondary cell (pSCell) of the SCG. The method further includes receiving a physical downlink shared channel (PDSCH) on at least one LAA serving cell in the SCG. The method additionally includes determining a channel to carry the UCI, the channel being on a serving cell in the SCG. The method also includes determining transmission timing of the channel based on reception timing of the received PDSCH. The method further includes determining one or more PDSCHs of which hybrid automatic repeat request acknowledgment (HARQ-ACK) bits are included in the UCI, the one or more PDSCHs including the received PDSCH. The method additionally includes determining content of the HARQ-ACK bits. The method also includes performing a channel access procedure for transmission of the channel.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13 and/or 14). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD carrier aggregation (CA) in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Licensed-assisted access (LAA) may support LTE in unlicensed spectrum. In an LAA network, the DL transmission may be scheduled in an opportunistic manner. For fairness utilization, an LAA eNB may perform functions such as clear channel assessment (CCA), listen before talk (LBT) and dynamic frequency selection (DFS).

In Release-14, LAA UL may support LAA transmission on UL including a physical uplink shared channel (PUSCH), a physical uplink control channel (PUCCH), a physical random access channel (PRACH), etc. The UCI of licensed cells may not be reported on an LAA cell, but the UCI of LAA cells may be reported on an LAA cell.

For UCI transmission on an LAA cell, the UE behavior of failed contention access has to be considered. The systems and methods described herein provide approaches for UCI transmissions on an LAA cell. In particular, the association subframe set and timing for LAA DL transmissions and HARQ-ACK reporting are described herein.

Currently, the UCI feedback (e.g., HARQ-ACK) has fixed association timing to a DL transmission. For an LAA cell, the transmission of an LAA UL subframe that contains UCI cannot be guaranteed in a scheduled subframe. Thus, multiple subframes may be allocated for an LAA UL UCI reporting to provide better success rates.

In Release-14, the UCI of LAA cells may be reported on an LAA cell or a licensed cell. Due to the unreliable nature of unlicensed access, some conditions and restrictions may be applied for UCI reporting on an LAA cell. In this disclosure, approaches to determine the LAA UCI reporting cell are described. For example, the LAA UCI reporting cell may include a reporting cell based on configuration, a reporting cell based on whether UCI is reported for licensed cells, a reporting cell based on scheduling methods, etc.

Furthermore, since the UE has to perform LBT before an LAA UCI transmission, the UCI report timing cannot be fixed as in licensed cells. In this disclosure, approaches to determine the UCI transmission timing (e.g., for HARQ-ACK feedback of LAA DL transmissions) are also described. These approaches include HARQ-ACK timing that can be indicated by scheduling information. HARQ-ACK may also be reported in a number of continuous subframes. The HARQ-ACK bits may be aggregated considering multiple LAA DL subframes. Furthermore, a UL subframe set may be associated with an LAA DL subframe burst.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for reporting uplink control information (UCI) with licensed-assisted access (LAA) may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE UCI reporting module 126.

For an LAA transmission, the transmitter is required to perform clear channel assessment (CCA) detection and listen before talk (LBT). If the channel is occupied by other unlicensed signals, an LAA transmitter should defer the scheduled transmission and try again later.

For LAA, transmission of HARQ-ACK for serving cells at licensed carriers on an LAA secondary cell (SCell) may not be supported. Transmission of HARQ-ACK and CSI for serving cells at unlicensed carriers on an LAA SCell may be supported.

Uplink control information (UCI) is important control information reported to an eNB 160 from a UE 102. The UCI may include HARQ-ACK feedback for PDSCH transmissions. UCI may also include a scheduling request (SR) when a UE 102 has UL data and requests for the eNB 160 to schedule a UL transmission. UCI may further include periodic channel state information (P-CSI), including a channel quality indicator (CQI), precoding matrix indicator (PMI) and rank indication (RI), which is configured by the eNB 160 to report periodically. UCI may additionally include aperiodic channel state information (A-CSI), including CQI, PMI and RI, which is triggered by the eNB 160 to report channel state information (CSI) based on a CSI request field.

In the UCI, HARQ-ACK and SR may have the highest priority. HARQ-ACK, SR and P-CSI may be reported on the PUCCH or PUSCH depending on the scheduled transmissions and higher layer parameters. A-CSI may only be reported on a PUSCH transmission given by the UL grant with the CSI request.

The UCI of LAA cells may be reported in an LAA UL transmission or on a licensed cell. There are several issues for UCI reporting on an LAA cell. A first issue is how to determine whether the UCI of an LAA cell should be reported on a licensed or an unlicensed cell. A second issue is how to determine the UCI reporting timing and UE behavior if the UE 102 cannot obtain the channel in a given subframe.

In an aspect, determining the cell for LAA UCI reporting is described herein. In current carrier aggregation (CA) without dual connectivity, UCI may be a carrier on a PUCCH of the primary cell (PCell), or on a PUSCH with the lowest cell index or both PUCCH and PUSCH.

The time and frequency resources that can be used by the UE 102 to report CSI may include a channel quality indicator (CQI), precoding matrix indicator (PMI), precoding type indicator (PTI), and/or rank indication (RI). These are controlled by the eNB 160. For spatial multiplexing, the UE 102 may determine an RI corresponding to the number of useful transmission layers. For transmit diversity, the RI may be equal to one.

As mentioned above, CSI reporting may be periodic or aperiodic. If the UE 102 is configured with more than one serving cell, the UE 102 transmits CSI for activated serving cell(s) only. If a UE 102 is not configured for simultaneous PUSCH and PUCCH transmission, the UE 102 may transmit periodic CSI reporting on the PUCCH in subframes with no PUSCH allocation.

If a UE 102 is not configured for simultaneous PUSCH and PUCCH transmission, the UE 102 may transmit periodic CSI reporting on the PUSCH of the serving cell with the smallest ServCellIndex in subframes with a PUSCH allocation. The UE 102 may use the same PUCCH-based periodic CSI reporting format on PUSCH.

A UE 102 may transmit aperiodic CSI reporting on PUSCH if the conditions for A-CSI are met. For aperiodic CQI/PMI reporting, RI reporting is transmitted only if the configured CSI feedback type supports RI reporting. In case both periodic and aperiodic CSI reporting would occur in the same subframe, the UE 102 may only transmit the aperiodic CSI report in that subframe.

Since UCI of licensed cells cannot be reported on an LAA cell, if dual connectivity is not configured for CA, and if UCI of both licensed and LAA cells needs to be reported in a subframe, the UCI of both licensed and LAA cells may be reported on the PUCCH on the PCell if there is no PUSCH scheduled. Alternatively, the UCI of both licensed and LAA cells may be reported on a PUSCH on a licensed cell with the lowest cell index among licensed cells.

Thus, even if PUSCH on an LAA cell is scheduled, and the LAA cell has the lowest cell index among all cells with PUSCH scheduling, the UCI of both licensed and LAA cells may be reported on the PUCCH of the PCell if no PUSCH is scheduled on the licensed cell. Alternatively, the UCI of both licensed and LAA cells may be reported on a PUSCH on a licensed cell even if it has a higher cell index than the LAA cell.

If dual connectivity is not configured for CA, and if only UCI of LAA cells needs to be reported, the UCI of LAA cells may be reported on the PUCCH on the PCell if there is no PUSCH scheduled, on a PUSCH of a licensed cell with the lowest cell index, or a PUSCH on an LAA cell if it has the lowest cell index. Thus, if PUSCH on an LAA cell is scheduled, and the LAA cell has the lowest cell index among all cells with PUSCH scheduling, the UCI of LAA cells may be reported on the LAA PUSCH.

However, considering the reliability of the licensed cell, it may be a better choice to transmit LAA UCI on a licensed cell when dual connectivity in CA is not configured. For example, the PUCCH may be transmitted on the PCell if there is no PUSCH scheduled or a PUSCH is scheduled and simultaneous PUCCH and PUSCH transmission is configured. A PUSCH may be transmitted on a licensed cell with the lowest cell index among licensed cells. As an exceptional case, if a PUSCH is scheduled only on LAA cells and simultaneous PUCCH and PUSCH transmission is not configured, then a PUCCH may be transmitted on the PCell and the UCI may also be reported on a PUCCH of the PCell.

In carrier aggregation (CA) with dual connectivity, PUCCH can be carried on a primary secondary cell (pSCell). If an LAA cell is configured as a pSCell for UCI reporting, it can only carry UCI of LAA cells. Thus, if an LAA cell is configured as a pSCell, the secondary cell group (SCG) can only contain LAA cells. But, the master cell group (MCG) may include both licensed and LAA cells.

In dual connectivity, the UCI is reported independently of each cell group (CG). On the other hand, the UCI of LAA cells may be reported on a licensed cell or unlicensed cell. Considering the reliability issues of LAA cells, for a CG with only LAA cells, some conditions can be defined to determine where the UCI of LAA cells should be reported under dual connectivity.

In a first approach (Approach 1), the UCI reporting cell of LAA cells is configured by higher layer. In one implementation, all UCI is reported on a licensed cell even if an LAA cell is configured as a pSCell. However, this is contradictory to the intention of dual connectivity. In another implementation, UCI of LAA cells in the cell group with an LAA cell as a pSCell is always reported on the LAA pSCell. In this approach, the UCI reporting is independent of the DL scheduling method. This extends the dual connectivity for a CA concept to LAA cells.

In a second approach (Approach 2), the UCI reporting cell is determined by the scheduling method. If a PDSCH is cross-carrier scheduled by a licensed cell, the HARQ-ACK feedback may be reported on a licensed cell (e.g., the PUCCH on the PCell). For scheduling from a licensed cell, the eNB 160 may expect to receive HARQ-ACK feedback based on licensed cell timing, thus a licensed cell may be used.

If a PDSCH is self-scheduled on an LAA cell or cross-carrier scheduled from another LAA SCell, the HARQ-ACK feedback may be reported on an LAA cell (e.g., the LAA pSCell or an LAA PUSCH transmission). Furthermore, in future networks with dual connectivity where an LAA cell is configured as a pSCell, or future networks with standalone unlicensed LTE operations where an LAA cell is configured as a PCell, the UCI of unlicensed cells may only be reported on an unlicensed pSCell or PCell.

In a third approach (Approach 3), the UCI reporting cell is determined based on whether there is other UCI to be reported on licensed cells in the same subframe. If there is UCI to be reported for both licensed cells and LAA cells, the UCI of both licensed and LAA cells is reported on a licensed cell. If only UCI of LAA cells is reported, the UCI is carried on an LAA cell. This approach reduces the need of multiple UCI reporting on multiple cells when UCI of both licensed and LAA cells is reported in the same subframe.

Approach 2 and Approach 3 may be applied independently or jointly. If applied jointly, the UCI of LAA cells may be carried on an LAA cell if only UCI of LAA cells is reported and the PDSCH transmissions on an LAA cell are self-scheduled or cross-carrier scheduled by another LAA cell.

In a fourth approach (Approach 4), the LAA UCI report cell switches from an LAA cell to a licensed cell. The LAA cell is not as reliable as a licensed cell because LBT has to be performed to contend for channel access. In the case of a failed LBT for channel access, the UE 102 may switch back to a licensed cell for UCI reporting. If the LAA UCI transmission on a scheduled LAA cell is not successful, the UCI of LAA cells may be reported on a licensed cell immediately after the scheduled LAA UCI transmission attempts. The timing of switching to a licensed cell depends on the allowed LAA UCI reporting configuration, which will be discussed below.

DL association for HARQ-ACK reporting timing on an LAA cell is also described herein. In current LTE systems, the UCI feedback corresponds to DL PDSCH transmissions or DL scheduling. The timing between the corresponding DL transmission and the UCI feedback is fixed. For example, HARQ-ACK may be reported 4 ms after a PDSCH transmission for a frequency division duplexing (FDD) cell. The HARQ-ACK timing on the UL may be determined based on a DL association set for a system with a time division duplexing (TDD) primary cell.

For UCI reporting on an LAA cell (e.g., an LAA pSCell), LBT has to be performed before an LAA UL transmission. For an LAA eNB 160, if a subframe n on an LAA carrier is scheduled for UL transmission or a UCI reporting, the eNB 160 may not schedule any LAA DL transmission on subframe n on the same LAA cell. However, there may be other unlicensed networks, such as WiFi and other LAA cells from other operators in the same or adjacent areas. If the fixed association timing as in licensed cells is used, the UCI has to be dropped if the LBT does not get the channel in the given UL subframe. This may cause serious performance issues.

Furthermore, depending on the regulatory regulations, different regions may have different maximum channel occupancy time (MCOT) requirements. Thus, an LAA DL transmission may have variable length. The time a UL can be transmitted after an LAA DL subframe may also be variable. Therefore, it may be difficult to maintain a fixed timing for UCI (e.g., HARQ-ACK feedback) for an LAA PDSCH. The UL transmission with UCI on an LAA cell should be more flexible.

Timing of HARQ-ACK feedback is an issue for LAA operation. For both FDD and TDD subframe types, the linkage between a PDSCH and a HARQ-ACK feedback has a fixed timing. In FDD, a fixed 4 ms is applied. In TDD, the DL and UL allocation is determined by a UL/DL configuration. Although an LAA cell operates in a half-duplex manner, unlike a TDD UL/DL configuration, the LAA DL and UL may switch at any subframe. Furthermore, an LAA DL burst may have a different maximum channel occupancy time (MCOT) depending on the priority class or the regional regulatory requirements. Thus, flexible timing between an LAA PDSCH and LAA HARQ-ACK reporting should be supported. The timing flexibility may include two aspects: the starting subframe that a HARQ-ACK may be reported; and the allowed range that the HARQ-ACK can be reported (also referred to herein as an allowed UCI transmission range).

Figure 3:
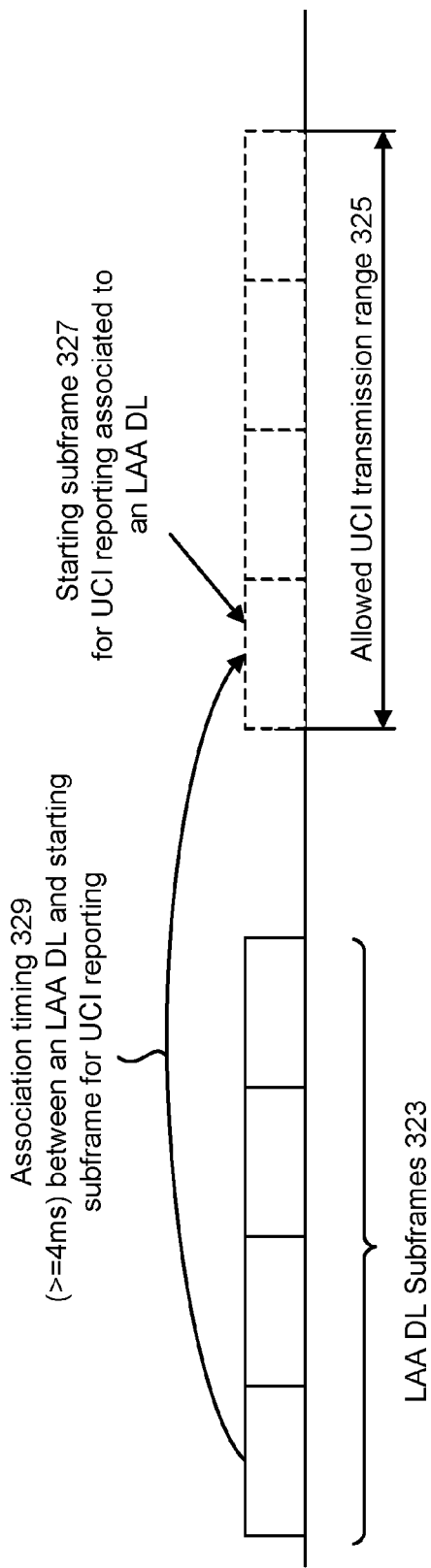
FIG. 3 illustrates an example of association timing and an allowed UCI transmission range for LAA cells.

The starting subframe that HARQ-ACK may be reported for a PDSCH defines the delay requirements between a PDSCH transmission and the HARQ-ACK feedback. Since the UE 102 has to perform LBT for channel access, the LAA UL transmission in the UCI report starting subframe cannot be guaranteed. A range of consecutive subframes may be configured to allow multiple access opportunities for the UCI transmission. Several options may be employed to configure these parameters. FIG. 3 shows the concept of association between an LAA DL and the starting subframe for UCI reporting as well as the allowed UCI transmission or reporting range.

In one option, the start timing may be a fixed number of subframes after the LAA PDSCH transmission. To maintain backward compatibility of HARQ-ACK timing, the delay should not be less than 4 ms. The eNB 160 may ensure there is no collision between LAA DL transmissions at the same subframe.

The timing may be a fixed value (e.g., 4 ms) or configured by higher layer signaling based on the MCOT requirements of the given region. For instance, if the MCOT is 8 or 10 ms, the delay should be at least 8 or 10 ms to ensure the LAA DL burst is completed before UL attempts. With a fixed starting timing, the HARQ-ACK feedback is frame-by-frame based, similar to FDD cells. The allowed UCI reporting range may also be fixed (e.g., 4 subframes) or configured by higher layer signaling, such as Radio Resource Control (RRC) signaling.

In another option, the starting timing and/or the allowed transmission range may be indicated by physical layer signaling (e.g., in the PDSCH scheduling DCI). The PDSCH scheduling DCI may include extra bits to indicate the timing of HARQ-ACK feedback and the allowed range for the feedback delay of a PDSCH transmission. The distance between an LAA PDSCH transmission and an LAA HARQ-ACK feedback should not be smaller than 4 ms. A delay offset value may be indicated for the first subframe that can be used for UCI transmission. Similarly, the allowed UCI reporting range may be fixed (e.g., 4 subframes) or configured by higher layer signaling, such as RRC signaling, or indicated in the DL scheduling DCI format.

HARQ-ACK aggregation of UCI transmission is another issue for LAA operation. Besides the UCI reporting timing and allowed range, the HARQ-ACK bits of the UCI feedback should also be considered.

Figure 4:
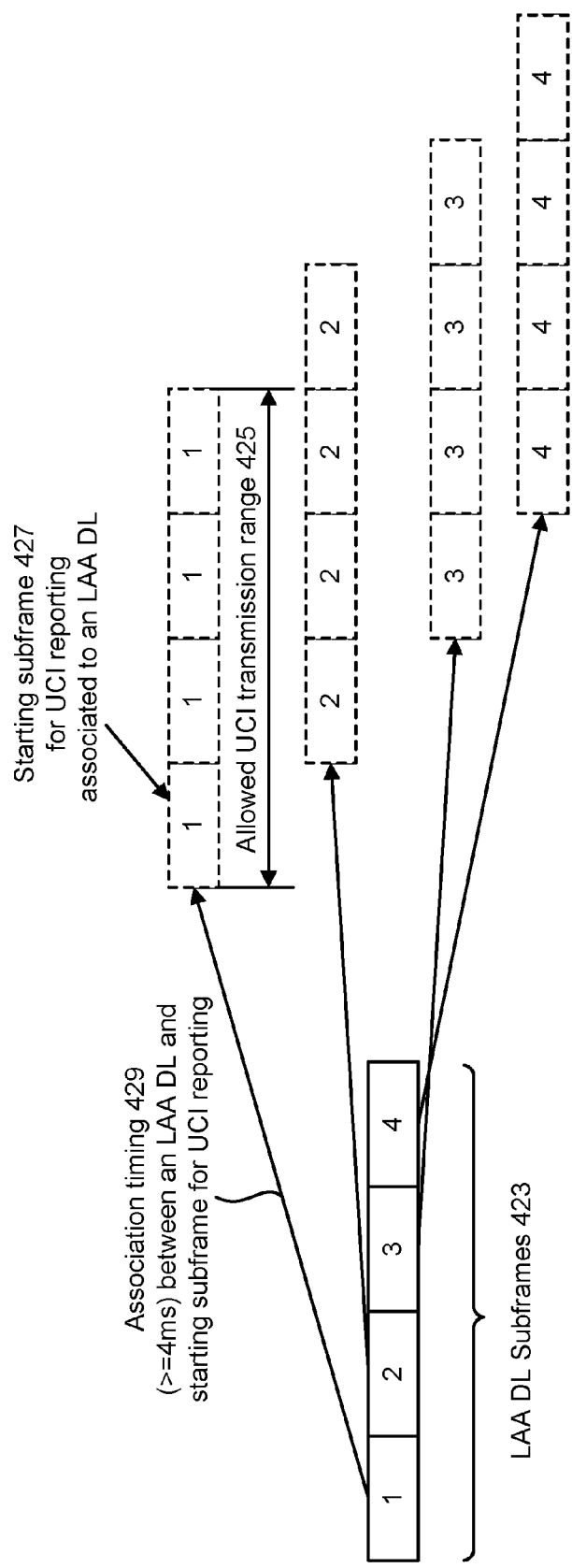
FIG. 4 illustrates an example of an independent hybrid automatic repeat request acknowledgment (HARQ-ACK) reporting region for each LAA downlink (DL) subframe.

In a first approach to HARQ-ACK aggregation of UCI (Approach 1), HARQ-ACK may be reported independently for each LAA PDSCH. In both options above, if the HARQ-ACK feedback starting subframe and allowed transmission range are applied for each LAA PDSCH transmission, a sliding window is formed for the HARQ-ACK feedback. Thus, an LAA UL feedback has to be reported for each LAA PDSCH transmission subframe even if they are targeted to the same LAA UE 102. This may introduce more restriction on LAA DL scheduling and more channel contention on the LAA cell, which reduces the spectrum efficiency of the LAA cell. Furthermore, the allowed UCI reporting subframe may overlap among multiple LAA DL subframes. FIG. 4 shows an example of a sliding reporting region for each DL subframe.

For the HARQ-ACK feedback of the same UE 102, the HARQ-ACK of an earlier LAA PDSCH may always be transmitted earlier than that of a later LAA PDSCH subframe. However, if different UEs 102 contend for channel access, the HARQ-ACK of an earlier LAA PDSCH transmission for one UE 102 may be reported later than the HARQ-ACK of a later LAA PDSCH transmission for another LAA UE 102.

Figure 5:
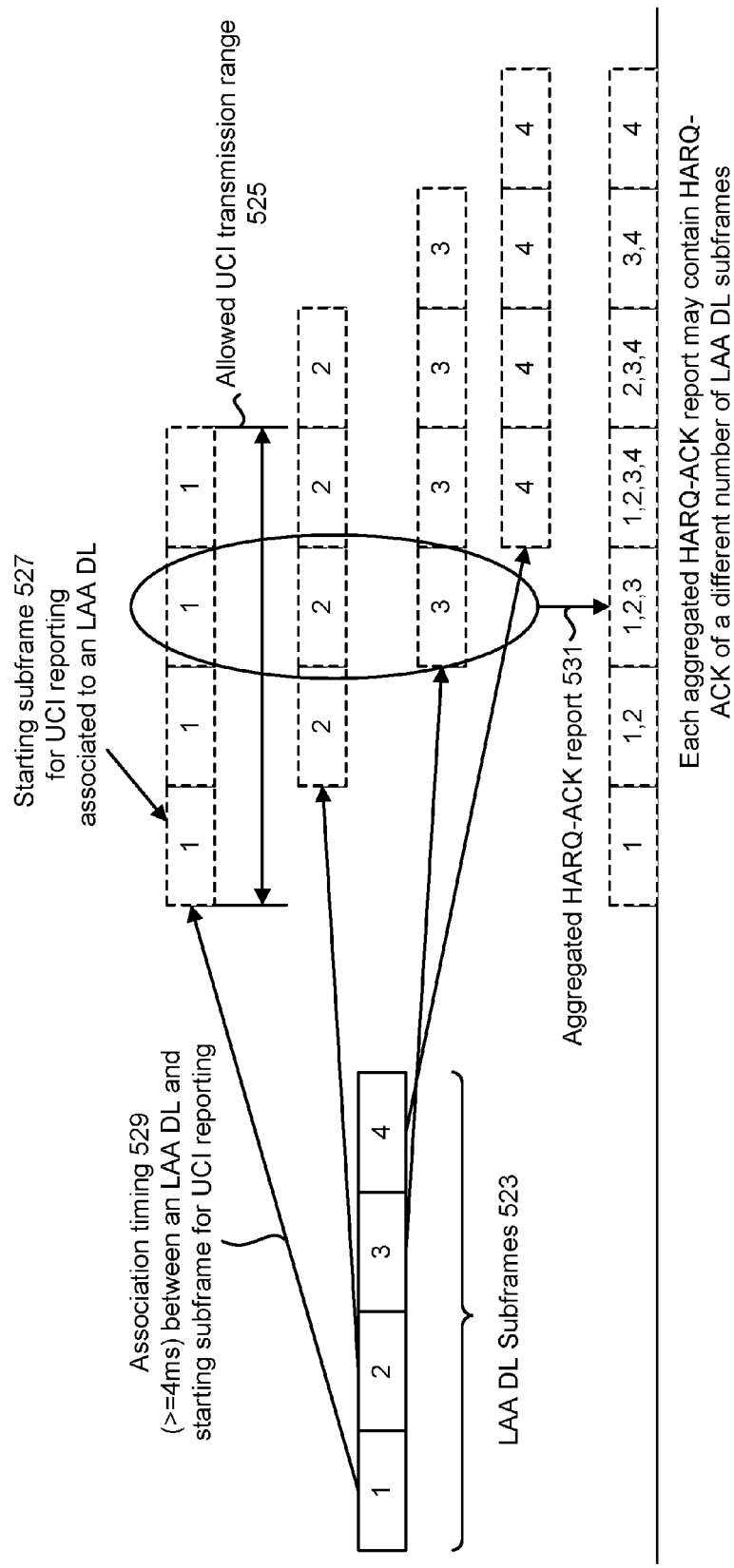
FIG. 5 illustrates an example of HARQ-ACK aggregation of independent UCI reporting regions for each LAA DL subframe.

In a second approach to HARQ-ACK aggregation of UCI (Approach 2), PDSCH HARQ-ACK bits may be concatenated. Considering multiple LAA subframes may need to be reported, PDSCH HARQ-ACK concatenation may be supported to reduce the number of LAA UL UCI reports at a UE 102. The HARQ-ACK bit can be aggregated if the previous transmission attempt is not successful. Thus, for a single UE 102, only one HARQ-ACK feedback is needed including all pending reports in the current LAA UL subframe. FIG. 5 shows an example of a sliding window of a UCI transmission region for each LAA DL subframe, and the HARQ-ACK aggregation based on the sliding window.

With HARQ-ACK aggregation, the UCI transmission region of each LAA DL subframe may be unchanged. The UE 102 may perform a single UL LBT process for UCI reporting. But the number of HARQ-ACK bits in each aggregated HARQ-ACK report may contain HARQ-ACK of a different number of LAA DL subframes.

If the HARQ-ACK of an LAA DL subframe is already reported in an LAA UL UCI transmission, the same HARQ-ACK feedback does not need to be included in a later LAA UL UCI transmission. The DL subframe number included in the UCI reporting region indicates the maximum number of DL associations to the given LAA UL UCI reporting assuming LAA UL LBT in previous subframes fails.

This approach may result in variable length HARQ-ACK bits, and may make the HARQ-ACK transmission and reception more complicated. On the other hand, this approach reduces the required number of LAA UL transmissions for HARQ-ACK reports, especially when the channel is congested.

In another implementation, the HARQ-ACK bits may be fixed to include HARQ-ACK of all LAA DL subframes that include the given subframe in their allowed transmission range.

In a third approach to HARQ-ACK aggregation of UCI (Approach 3), an LAA DL set is associated with an LAA UL subframe set for HARQ-ACK feedback. In this approach to HARQ-ACK aggregation, the starting timing and/or the allowed transmission range for multiple LAA PDSCH transmissions may be indicated by physical layer signaling to the same allowed UCI transmission subframe set. Thus, the UE 102 may aggregate the HARQ-ACK bits for multiple LAA PDSCH transmissions and report in the scheduled starting subframe and allowed UCI transmission region. This approach links a set of LAA PDSCH subframes to an LAA UL subframe set. Extra bits may be indicated by the eNB 160 on the number of subframes in this HARQ-ACK feedback.

To maintain backward compatibility for HARQ-ACK timing, the association timing delay should not be less than 4 ms. Therefore, the association timing delay for different LAA DL subframes in the LAA DL set may be different to associate with the same starting subframe for UCI reporting with LAA UL.

Figure 6:
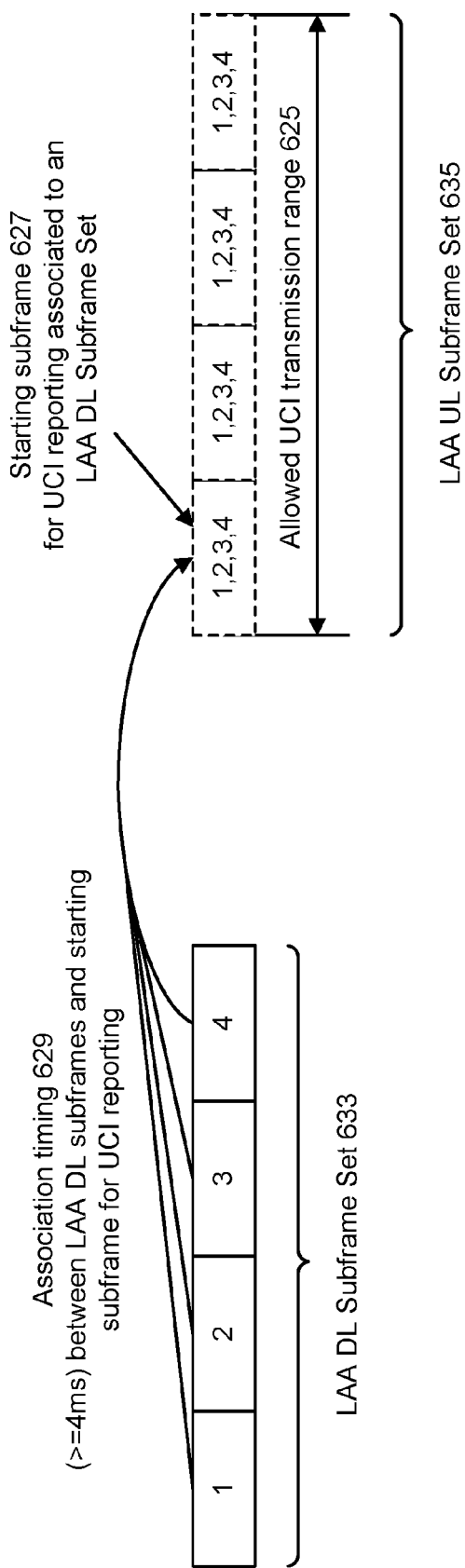
FIG. 6 illustrates an example of an association of an LAA UL subframe set to an LAA DL subframe set.

In this approach, a UL subframe set may be configured for UCI transmission, and a DL association set may be defined for a UL subframe set. This is similar to TDD, but in LAA UL, the DL association set is linked to a UL subframe set instead of each UL subframe. The content of HARQ-ACK bits may be different in each subframe in a UL subframe set to allow faster HARQ-ACK feedback. The content of HARQ-ACK bits may be the same in each subframe in a UL subframe set to reduce the complexity of decoding. FIG. 6 shows an example of association of an LAA UL subframe set to an LAA DL subframe set.

As one special case of a UL subframe set, PDSCH HARQ-ACK feedback may be associated for each LAA DL burst. The allowed HARQ-ACK feedback subframes may be configured for all subframes or a subset of subframes of an LAA DL burst. Thus, a UL subframe set can be associated with an LAA DL burst. The timing may be fixed upon the detection of the start of a DL burst, and the number of HARQ-ACK bits may also be fixed. This simplifies the HARQ-ACK bits encoding and decoding, which may be more reliable compared with variable HARQ-ACK lengths.

Figure 7:
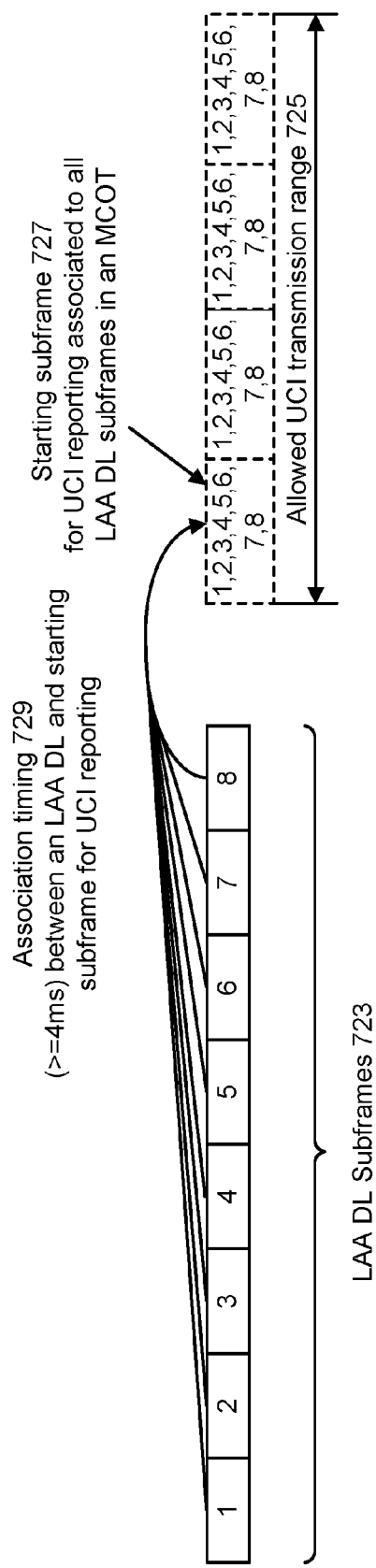
FIG. 7 illustrates an example of a single LAA uplink (UL) UCI transmission range for all LAA DL subframes in a maximum channel occupancy time (MCOT)
Figure 8:
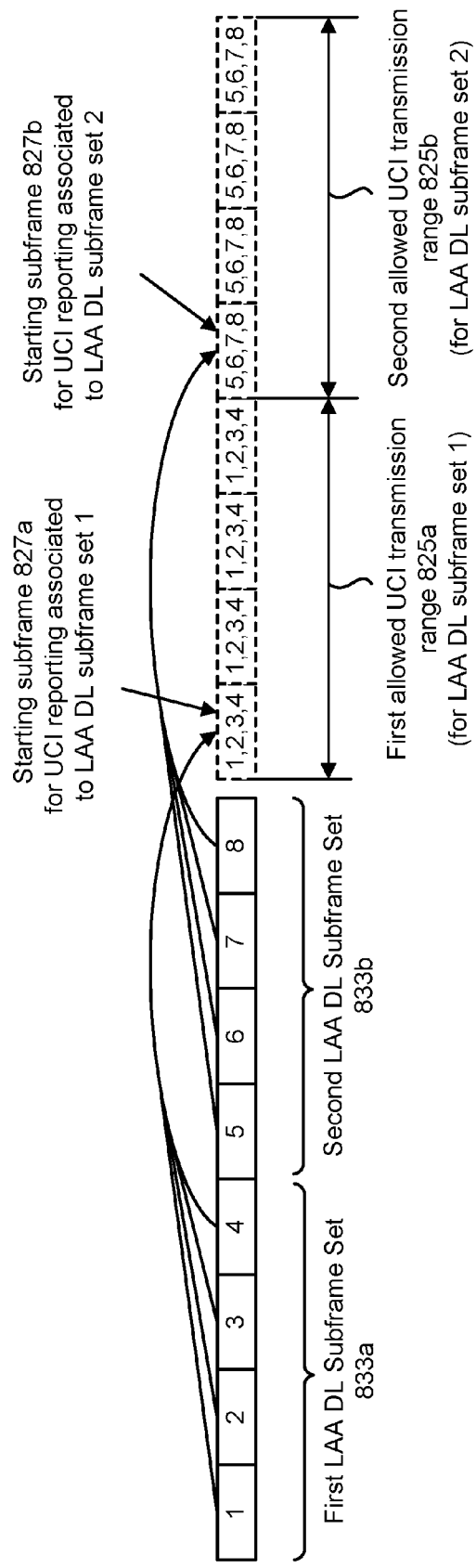
FIG. 8 illustrates an example of multiple sets of an LAA UL UCI transmission range for multiple LAA DL subframe sets in an MCOT.
Figure 9:
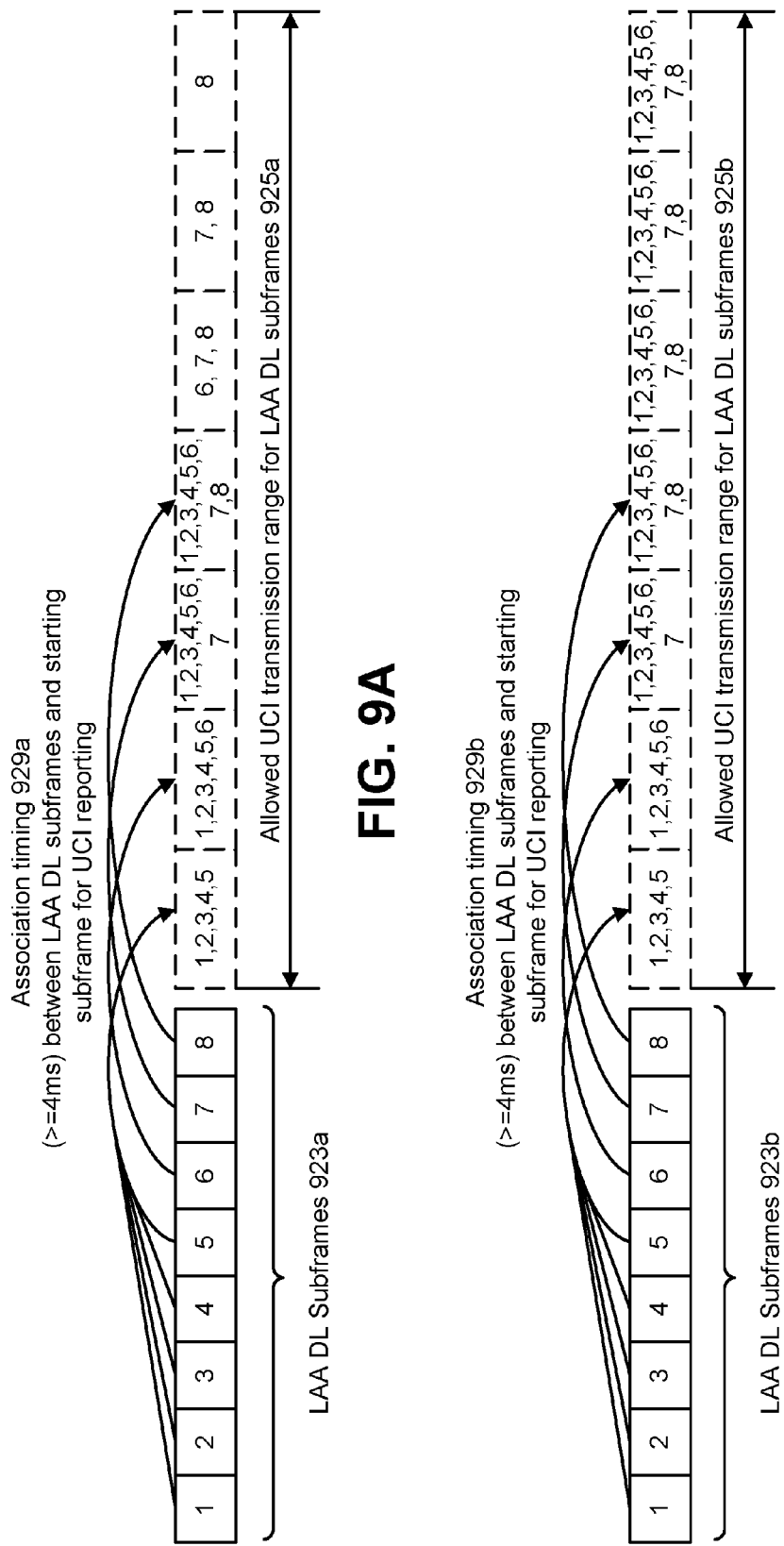
FIGS. 9A and 9B illustrate examples of an LAA UL UCI transmission range with reduced reporting latency.

For DL bursts with different MCOTs, different LAA UL subframe sets may be configured. In one implementation, an LAA UL subframe set may associate with all LAA DL subframes in an MCOT. In another implementation, an LAA UL subframe set may associate with a subset of LAA DL subframes in an MCOT. In this implementation, the LAA UL subframe set may or may not overlap with each other. The content of HARQ-ACK bits may be different in each subframe in a UL subframe set to allow faster HARQ-ACK feedback. The content of HARQ-ACK bits may be the same in each subframe in a UL subframe set to reduce the complexity of decoding. Examples of different methods of HARQ-ACK association for LAA DL subframes in an MCOT are shown in FIGS. 7, 8 and 9.

In a fourth approach to HARQ-ACK aggregation of UCI (Approach 4), the HARQ-ACK of all HARQ processes is reported in each HARQ-ACK reporting. This approach to aggregate the HARQ-ACK bits is to consider the HARQ-ACK processes. An LAA cell may have a limited number of HARQ-ACK processes, and an LAA HARQ-ACK reporting may adopt a new PUCCH or PUSCH structure that supports a large payload size. The HARQ-ACK of all HARQ processes may be reported in each HARQ-ACK reporting. The HARQ-ACK reporting timing may follow the approaches described above. Alternatively, a UE 102 may initiate a HARQ-ACK report 4 ms after an LAA PDSCH targeted for the given UE 102. In each HARQ-ACK report, the latest HARQ-ACK status of all HARQ processes may be reported to the eNB 160.

The above approaches describe the HARQ-ACK feedback for a single LAA cell. In CA and a cell group with multiple LAA serving cells, the HARQ-ACK timing approaches may be applied on each LAA cell, and the HARQ-ACK bits of all serving cells may be aggregated together and reported on an LAA serving cell.

LBT mechanisms for UCI reporting on an LAA cell are also described herein. In one approach, a single 25 microsecond LBT before UL transmission may be used in each potential UCI reporting subframe. If the LAA UL is successful, the remaining UCI reporting region may be abandoned by the UE 102.

In another approach, continuous category 4 LBT with backoff handling may be used in the allowed UCI transmission region, and the UCI is reported in an LAA UL transmission when the LBT becomes successful. However, this approach may block other UEs 102 from transmitting a UCI reporting LAA UL subframe.

No matter what HARQ-ACK reporting and aggregation approaches are used, if the LAA UCI cannot be reported after the allowed UCI transmission region, two approaches can be considered. In one approach, the LAA UCI may be dropped. In another approach, the reporting cell switching may be applied so that the LAA UCI can be reported on a licensed cell after the UL subframe set is expired.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB UCI reporting module 194.

The eNB UCI reporting module 194 may receive UCI from a UE 102 on a channel in a secondary cell group (SCG). The UCI may include HARQ-ACK feedback corresponding to one or more PDSCHs transmitted on the SCG. At least one PDSCH may be transmitted on an LAA serving cell in the SCG.

A licensed cell may be used for UCI reporting if UCI of both licensed and LAA cells needs to be reported. An LAA cell may be used for UCI reporting if UCI of only LAA cells of the SCG needs to be reported.

If only LAA cells of the SCG need to be reported in a subframe, then a licensed cell may be used for UCI reporting when an LAA PDSCH is cross-carrier scheduled from a licensed cell. Alternatively, an LAA cell may be used for UCI reporting if an LAA PDSCH is self-scheduled or cross-carrier scheduled from another LAA cell in the same cell group (CG).

In an implementation, the start subframe and the set of subframes allowed for UCI transmission may be determined by a fixed value or higher layer signaling. In another implementation, the start subframe and the set of subframes allowed for UCI transmission may be determined by a downlink scheduling downlink control information (DCI).

In an implementation, the HARQ-ACK feedback of each LAA DL subframe is generated and reported, by the UE 102, independently following the determined transmission timing and range. In another implementation, the HARQ-ACK feedback of each LAA DL subframe is generated and aggregated together, by the UE 102, in a single HARQ-ACK report based on the determined transmission timing and range.

The eNB operations module 182 may provide information 190 to the one or more receivers 178. For example, the eNB operations module 182 may inform the receiver(s) 178 when or when not to receive UCI.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on the UCI. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
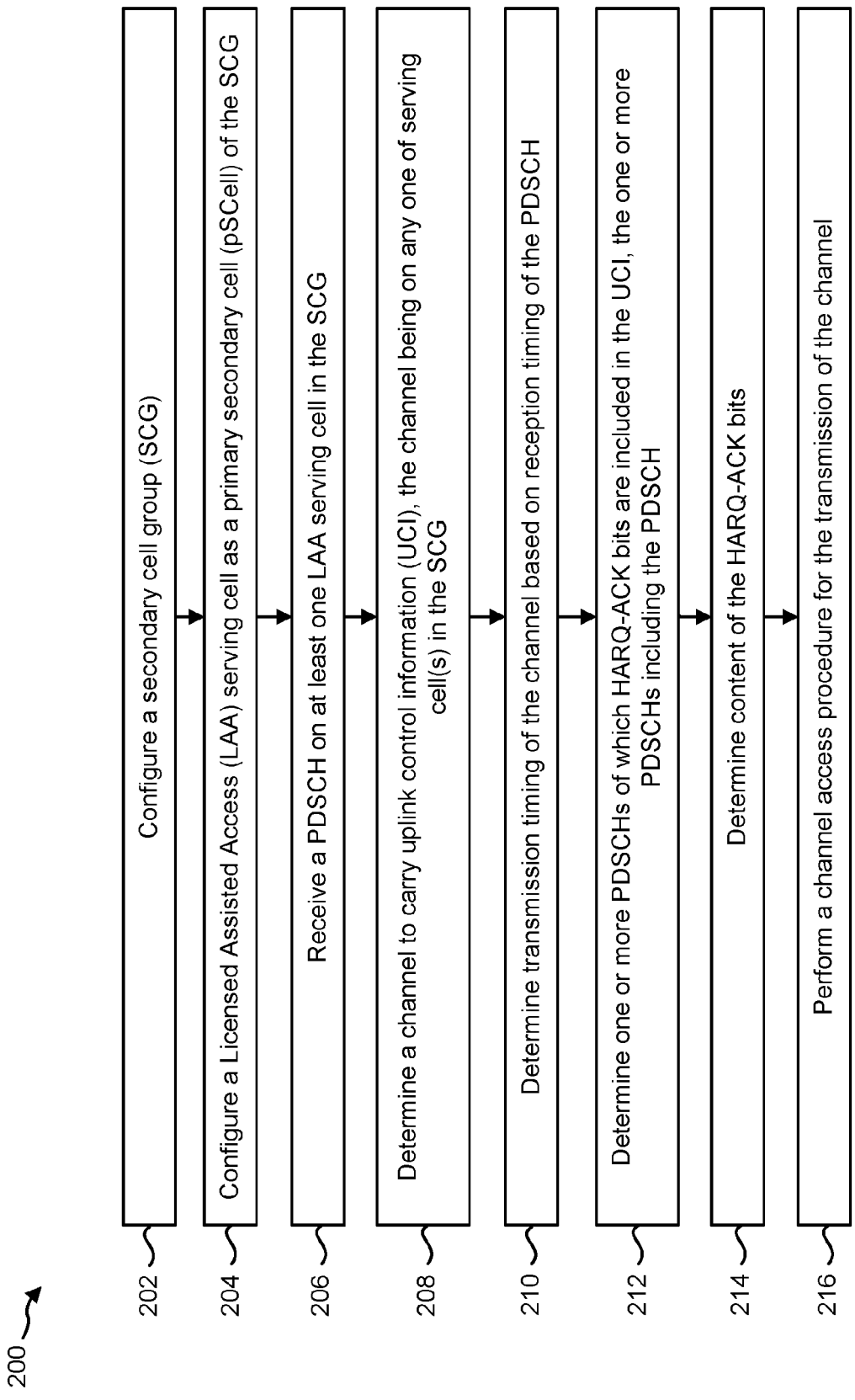
FIG. 2 is a flow diagram illustrating one implementation of a method for reporting UCI.

FIG. 2 is a flow diagram illustrating one implementation of a method 200 for reporting UCI. The method 200 may be implemented by a UE 102. The UE 102 may communicate with one or more eNBs 160 in a wireless communication network. In one implementation, the wireless communication network may include an LTE network.

The term LAA serving cell may be defined as a serving cell configured with Frame structure type 3, which is different from either Frame structure type 1 or 2, where Frame structure type 1 is applicable to FDD and Frame structure type 2 is applicable to TDD with TDD DL-UL configurations 0-6. Alternatively, LAA serving cell may be defined as a serving cell configured for which an RRC bit field indicates that the concerned serving cell is an assisted serving cell. Yet alternatively, LAA serving cell may be defined as a serving cell configured with an LAA-specific functionality such as Received Signal Strength Indicator (RSSI) reporting, RSSI measurement timing configuration (RMTC), discovery reference signal (DRS) with less than 1 ms DRS occasion. Yet alternatively, LAA serving cell may be defined as a serving cell of which Evolved Universal Terrestrial Radio Access (EUTRA) Absolute Radio-Frequency Channel Number (EARFCN) indicates an unlicensed band (e.g., 5150-5925 MHz band). In contrast, a licensed serving cell may be defined as a serving cell that does not fulfill the above-described LAA serving cell definitions.

The UE 102 may configure 202 a secondary cell group (SCG). The UE 102 may configure 204 a licensed-assisted access (LAA) serving cell as a primary secondary cell (pSCell) of the SCG.

The UE 102 may receive 206 a PDSCH on at least one LAA serving cell in the SCG. The PDSCH may be received 206 from an eNB 160.

The UE 102 may determine 208 a channel to carry uplink control information (UCI), the channel being on any one of the serving cell(s) in the SCG. When at least one PDSCH is received on at least one LAA serving cell in the SCG with the LAA cell as the pSCell, then the UE 102 may determine 208 a licensed cell is used for UCI reporting if UCI of both licensed and LAA cells needs to be reported. Alternatively, the UE 102 may determine 208 an LAA cell is used for UCI reporting if UCI of only LAA cells of the SCG needs to be reported.

If only LAA cells of the SCG need to be reported in a subframe, then the UE 102 may determine 208 a licensed cell is used for UCI reporting if LAA PDSCH is cross-carrier scheduled from a licensed cell. If LAA PDSCH is self-scheduled or cross-carrier scheduled from another LAA cell in the same cell group (CG), then the UE 102 may determine 208 an LAA cell is used for UCI reporting.

The UE 102 may determine 210 transmission timing of the channel based on reception timing of the PDSCH. When at least one PDSCH is received on at least one LAA serving cell in the SCG with the LAA cell as the pSCell, the UE 102 may determine a starting subframe where the HARQ-ACK feedback of the PDSCH can be reported. The UE 102 may also determine a set of subframes where the HARQ-ACK feedback of the PDSCH may be reported. The HARQ-ACK feedback may be initiated after a fixed or predefined association timing if at least one PDSCH is received on the LAA cell.

In an implementation, the UE 102 may determine the start subframe and the set of subframes allowed for UCI transmission by a fixed value or higher layer signaling. In another implementation, the UE 102 may determine the start subframe and the set of subframes allowed for UCI transmission by a downlink scheduling downlink control information (DCI).

The UE 102 may determine 212 one or more PDSCHs of which HARQ-ACK bits are included in the UCI. The one or more PDSCHs may include the received PDSCH. The UE 102 may determine 214 content of the HARQ-ACK bits. The HARQ-ACK of all HARQ-ACK processes may be reported in a UCI transmission subject to a channel access procedure.

In an implementation, the HARQ-ACK feedback of each LAA DL subframe may be generated and reported independently following the determined transmission timing and range. In another implementation, the HARQ-ACK feedback of each LAA DL subframe may be generated and aggregated together in a single HARQ-ACK report based on a determined transmission timing and range. In yet another implementation, the HARQ-ACK feedback of a set of LAA DL subframes is generated and aggregated together and associated with a single UCI transmission start time and range.

The UE 102 may perform 216 a channel access procedure for the transmission of the channel. For example, the UE 102 may perform LBT.

FIG. 3 illustrates an example of association timing and an allowed UCI transmission range 325 for LAA cells. LAA DL subframes 323 are shown with an association timing 329 for UCI reporting. FIG. 3 shows the concept of association between an LAA DL and the starting subframe 327 for UCI reporting. In this implementation, the association timing 329 is greater than or equal to 4 ms between an LAA DL subframe 323 and the starting subframe 327 for UCI reporting.

The allowed UCI transmission or reporting range 325 may include a range of consecutive subframes configured to allow multiple access opportunities for the UCI transmission.

FIG. 4 illustrates an example of an independent HARQ-ACK reporting region for each LAA DL subframe 423. An association timing 429 between an LAA DL subframe 423 and the starting subframe 427 for UCI reporting is shown for each LAA DL subframe 423. In this approach, HARQ-ACK is reported independently for each LAA PDSCH.

Each LAA DL subframe 423 may have a sliding reporting region. It should be noted that the allowed UCI transmission range 425 of multiple LAA DL subframes 423 may overlap with each other.

For the HARQ-ACK feedback of the same UE 102, the HARQ-ACK of an earlier LAA PDSCH should always be transmitted earlier than that of a later LAA PDSCH subframe. In one approach, once the UE 102 gets channel access, it can transmit HARQ-ACK feedback for multiple DL subframes in continuous UL LAA subframes. In another approach, once the UE 102 gets channel access, it can transmit HARQ-ACK feedback for multiple DL subframes in continuous UL LAA subframes. In another approach, each HARQ-ACK feedback of each DL subframe of the UE 102 should contend for access independently. However, if different UEs 102 are contending for channel access, the HARQ-ACK of an earlier LAA PDSCH transmission for one UE 102 may be reported later than the HARQ-ACK of a later LAA PDSCH transmission for another LAA UE 102.

FIG. 5 illustrates an example of HARQ-ACK aggregation of independent UCI reporting regions for each LAA DL subframe 523. An association timing 529 between an LAA DL subframe 523 and the starting subframe 527 for UCI reporting is shown for each LAA DL subframe 523. In this approach, PDSCH HARQ-ACK bits may be aggregated for each LAA DL subframe 523.

As in the example of FIG. 4, each LAA DL subframe 523 may have a sliding reporting region. It should be noted that the allowed UCI transmission range 525 of multiple LAA DL subframes 523 may overlap with each other. However, in this approach, the UE 102 may generate an aggregated HARQ-ACK report 531 that contains HARQ-ACK of a different number of LAA DL subframes 523.

In the example of FIG. 5, for each LAA DL subframe 523, up to 4 consecutive subframes can be used to report the HARQ-ACK bits of the given LAA DL subframe. The starting subframe 527 for LAA DL subframe 1 may only report HARQ-ACK of subframe 1. If the LBT contention access fails, the UE 102 may try in the next subframe, but the feedback may contain HARQ-ACK of both LAA DL subframe 1 and subframe 2, and so on. On the other hand, if the HARQ-ACK reporting in the second LAA UL subframe succeeds, the HARQ-ACK of LAA DL subframe 1 and 2 are reported to eNB 160. In the next UL UCI reporting subframe, although it may contain HARQ-ACK for LAA DL subframe 1, 2, and 3, only HARQ-ACK of DL subframe 3 needs to be reported since the HARQ-ACK of LAA DL subframe 1 and 2 were already reported in the earlier UL UCI transmission.

FIG. 6 illustrates an example of an association of an LAA UL subframe set 635 to an LAA DL subframe set 633. This is an example of HARQ-ACK aggregation of an LAA DL subframe set 633 to the same LAA UL UCI transmission range 625 (i.e., the LAA UL subframe set 635). The starting subframe 627 for UCI reporting may be associated to the LAA DL subframe set 633.

In this approach to HARQ-ACK aggregation, the starting timing and/or the allowed UCI transmission range 625 for multiple LAA PDSCH transmissions may be indicated by physical layer signaling to the same allowed UCI transmission subframe set. Thus, the UE 102 should aggregate the HARQ-ACK bits for multiple LAA PDSCH transmissions and report in the scheduled starting subframe 627 and allowed UCI transmission range 625. This approach links a set of LAA PDSCH subframes to an LAA UL subframe set 635. Extra bits may be indicated by the eNB 160 on the number of subframes in this HARQ-ACK feedback.

Therefore, in this approach, an LAA UL subframe set 635 is configured for UCI transmission, and a DL association set is defined for an LAA UL subframe set. This is similar to TDD, but in an LAA UL, the DL association set is linked to a UL subframe set 635 instead of each UL subframe. The content of HARQ-ACK bits may be different in each subframe in a UL subframe set 635 to allow faster HARQ-ACK feedback. The content of HARQ-ACK bits may be the same in each subframe in a UL subframe set 635 to reduce the complexity of decoding.

To maintain backward compatibility of HARQ-ACK timing, the association timing 629 delay should not be less than 4 ms. Therefore, the association timing 629 delay for different LAA DL subframes in the LAA DL subframe set 633 may be different to associate with the same starting subframe 627 for UCI reporting with the LAA UL.

FIG. 7 illustrates an example of a single LAA UL UCI transmission range 725 for all LAA DL subframes 723 in a maximum channel occupancy time (MCOT). LAA DL subframes 723 are shown with an association timing 729 for UCI reporting. In this implementation, the association timing 729 is greater than or equal to 4 ms between an LAA DL subframe 723 and the starting subframe 727 for UCI reporting. In this example, all LAA DL subframes 723 in an MCOT of 8 ms are associated with a single LAA UL UCI transmission range 725.

FIG. 8 illustrates an example of multiple sets of an LAA UL UCI transmission range for multiple LAA DL subframe sets 833 in an MCOT. LAA DL subframe sets 833 are shown with an association timing for UCI reporting. In this implementation, the LAA DL subframes in an MCOT of 8 ms are divided into two subsets. A first LAA DL subframe set 833*a* includes LAA DL subframes 1-4 and a second LAA DL subframe set 833*b* includes LAA DL subframes 5-8. Each LAA DL subframe set 833 is associated with an LAA UL UCI transmission region. The first LAA DL subframe set 833*a* is associated with a first allowed UCI transmission range 825*a* with a first starting subframe 827*a* for UCI reporting. The second LAA DL subframe set 833*b* is associated with a second allowed UCI transmission range 825*b* with a second starting subframe 827*b* for UCI reporting.

FIGS. 9A and 9B illustrate examples of an LAA UL UCI transmission range 925 with reduced reporting latency. The approaches illustrated in FIGS. 9A and 9B may minimize the delay of HARQ-ACK feedback of an LAA DL subframe in an MCOT of 8 ms, but each LAA UL UCI reporting subframe may include a different number of LAA DL subframes. Thus, there may be a variable number of LAA DL subframe associations in each reporting subframe.

In FIG. 9A, association timing 929*a* between LAA DL subframes 923*a* and the starting subframe for UCI reporting is shown. The HARQ-ACK of each LAA DL subframe 923*a* can be reported in up to 4 subframes in the allowed UCI transmission range 925*a*.

In FIG. 9B, association timing 929*b* between LAA DL subframes 923*b* and the starting subframe for UCI reporting is shown. The HARQ-ACK of all available LAA DL subframes 923*b* can be reported in later LAA UL subframes in the allowed UCI transmission range 925*b*. If the HARQ-ACK of an LAA DL subframe 923*b* is already reported in an LAA UL UCI transmission, the same HARQ-ACK feedback does not need to be included in a later LAA UL UCI transmission.

Figure 10:
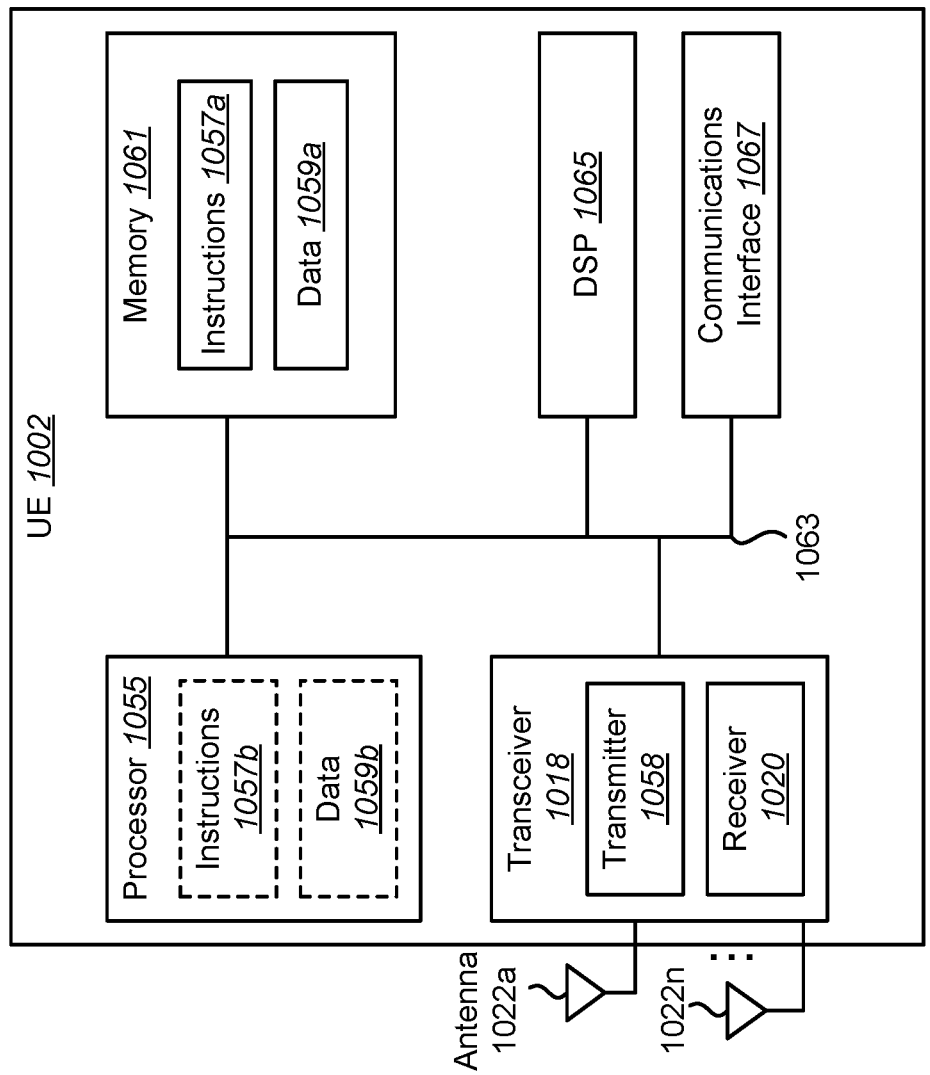
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1055 that controls operation of the UE 1002. The processor 1055 may also be referred to as a central processing unit (CPU). Memory 1061, which may include read-only memory (ROM), random access memory (RAM), a combination of the two or any type of device that may store information, provides instructions 1057*a* and data 1059*a* to the processor 1055. A portion of the memory 1061 may also include non-volatile random access memory (NVRAM). Instructions 1057*b* and data 1059*b* may also reside in the processor 1055. Instructions 1057*b* and/or data 1059*b* loaded into the processor 1055 may also include instructions 1057*a* and/or data 1059*a* from memory 1061 that were loaded for execution or processing by the processor 1055. The instructions 1057*b* may be executed by the processor 1055 to implement one or more of the method 200 described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022*a-n* are attached to the housing and electrically coupled to the transceiver 1018.

The various components of the UE 1002 are coupled together by a bus system 1063, which may include a power bus, a control signal bus and a status signal bus, in addition to a data bus. However, for the sake of clarity, the various buses are illustrated in FIG. 10 as the bus system 1063. The UE 1002 may also include a digital signal processor (DSP) 1065 for use in processing signals. The UE 1002 may also include a communications interface 1067 that provides user access to the functions of the UE 1002. The UE 1002 illustrated in FIG. 10 is a functional block diagram rather than a listing of specific components.

Figure 11:
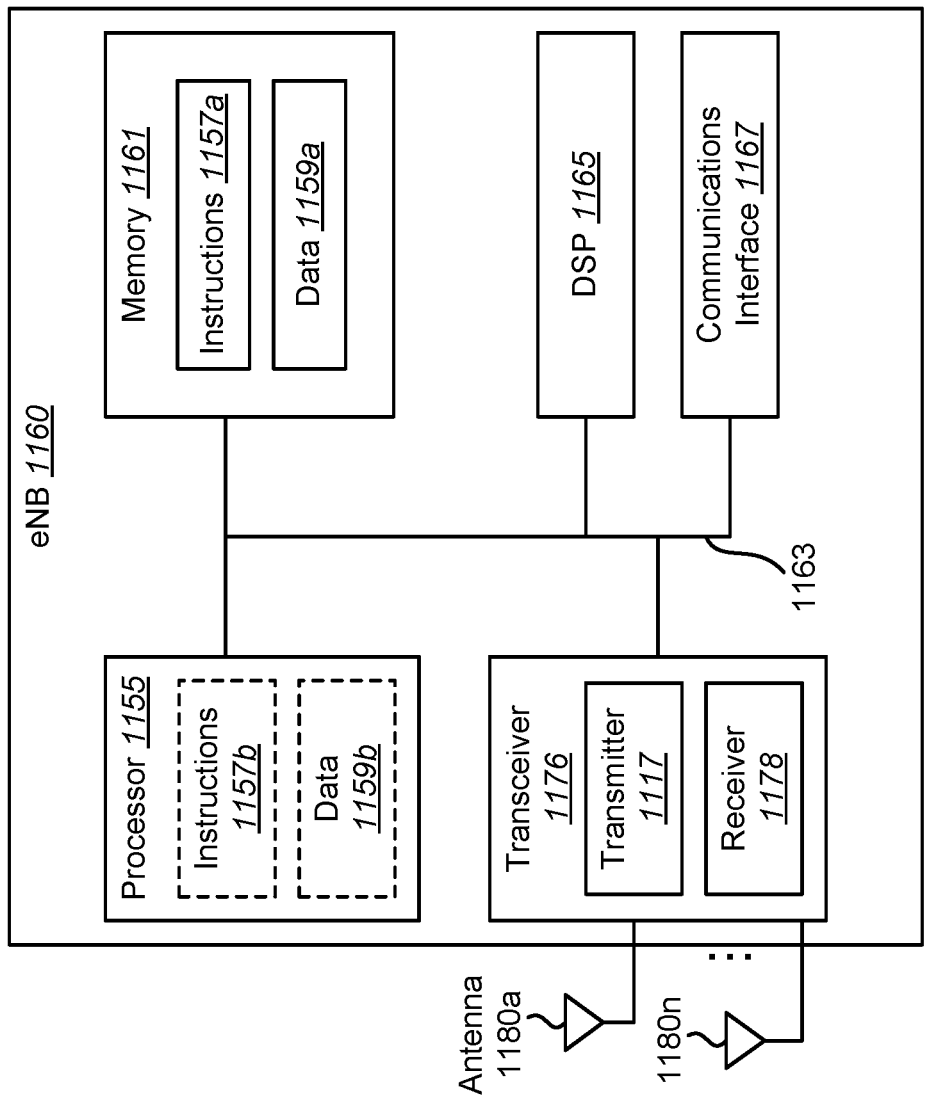
FIG. 11 illustrates various components that may be utilized in an eNB.

FIG. 11 illustrates various components that may be utilized in an eNB 1160. The eNB 1160 described in connection with FIG. 11 may be implemented in accordance with the eNB 160 described in connection with FIG. 1. The eNB 1160 includes a processor 1155 that controls operation of the eNB 1160. The processor 1155 may also be referred to as a central processing unit (CPU). Memory 1161, which may include read-only memory (ROM), random access memory (RAM), a combination of the two or any type of device that may store information, provides instructions 1157*a* and data 1159*a* to the processor 1155. A portion of the memory 1161 may also include non-volatile random access memory (NVRAM). Instructions 1157*b* and data 1159*b* may also reside in the processor 1155. Instructions 1157*b* and/or data 1159*b* loaded into the processor 1155 may also include instructions 1157*a* and/or data 1159*a* from memory 1161 that were loaded for execution or processing by the processor 1155. The instructions 1157*b* may be executed by the processor 1155 to implement one or more of the methods described above.

The eNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180*a-n* are attached to the housing and electrically coupled to the transceiver 1176.

The various components of the eNB 1160 are coupled together by a bus system 1163, which may include a power bus, a control signal bus and a status signal bus, in addition to a data bus. However, for the sake of clarity, the various buses are illustrated in FIG. 11 as the bus system 1163. The eNB 1160 may also include a digital signal processor (DSP) 1165 for use in processing signals. The eNB 1160 may also include a communications interface 1167 that provides user access to the functions of the eNB 1160. The eNB 1160 illustrated in FIG. 11 is a functional block diagram rather than a listing of specific components.

Figure 12:
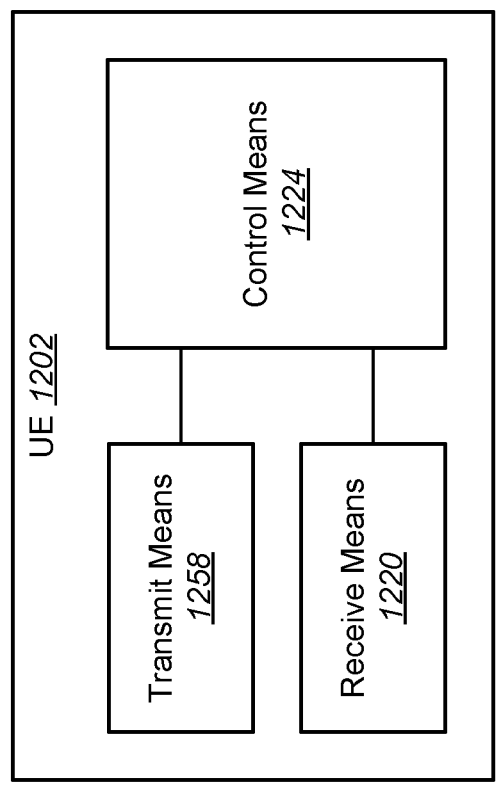
FIG. 12 is a block diagram illustrating one configuration of a UE in which systems and methods for reporting UCI with LAA may be implemented.

FIG. 12 is a block diagram illustrating one implementation of a UE 1202 in which systems and methods for reporting UCI with LAA may be implemented. The UE 1202 includes transmit means 1258, receive means 1220 and control means 1224. The transmit means 1258, receive means 1220 and control means 1224 may be configured to perform one or more of the functions described in connection with Figures above. FIG. 10 above illustrates one example of a concrete apparatus structure of FIG. 12. Other various structures may be implemented to realize one or more of the functions of the Figures. For example, a DSP may be realized by software.

Figure 13:
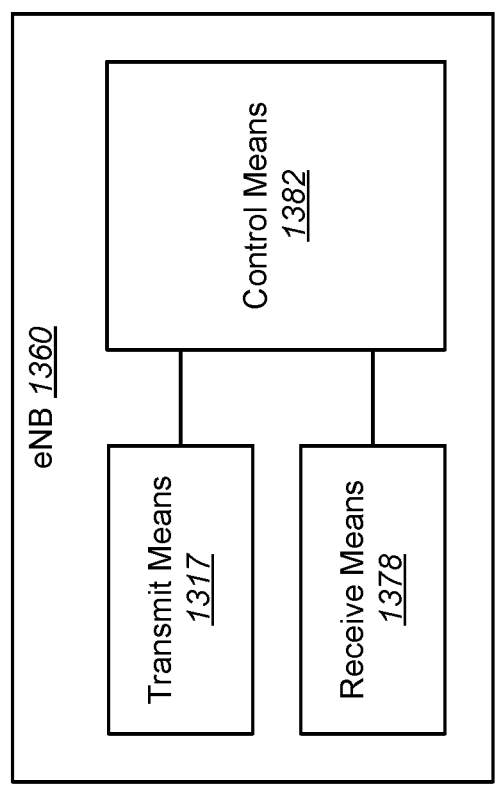
FIG. 13 is a block diagram illustrating one configuration of an eNB in which systems and methods for reporting UCI with LAA may be implemented.

FIG. 13 is a block diagram illustrating one implementation of an eNB 1360 in which systems and methods for reporting UCI with LAA may be implemented. The eNB 1360 includes transmit means 1317, receive means 1378 and control means 1382. The transmit means 1317, receive means 1378 and control means 1382 may be configured to perform one or more of the functions described in connection with Figures above. FIG. 11 above illustrates one example of a concrete apparatus structure of FIG. 13. Other various structures may be implemented to realize one or more of the functions of the Figures above. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:
1. A user equipment (UE) comprising:
a processor; and
memory in electronic communication with the processor, wherein instructions stored in the memory are executable to:
configure with a secondary cell group (SCG);
configure with a licensed-assisted access (LAA) serving cell as a primary secondary cell (pSCell) of the SCG;

receive a physical downlink shared channel (PDSCH) on at least one LAA serving cell in the SCG;

determine a channel to carry uplink control information (UCI), the channel being on a serving cell in the SCG;

determine transmission timing of the channel based on reception timing of the received PDSCH, wherein the transmission timing comprises a starting subframe and an allowed UCI transmission range when an LAA is used for UCI reporting;

determine one or more PDSCHs of which hybrid automatic repeat request acknowledgment (HARQ-ACK) bits are included in the UCI, the one or more PDSCHs including the received PDSCH;

determine content of the HARQ-ACK bits; and perform a channel access procedure for transmission of the channel.

2. The UE of claim 1, wherein when at least one PDSCH is received on at least one LAA serving cell in the SCG with an LAA cell as the pSCell, the instructions executable to determine the channel to carry the UCI comprise instructions executable to:

determine a licensed cell is used for UCI reporting if a UCI of both licensed and LAA cells needs to be reported; and determine the LAA cell is used for UCI reporting if a UCI of only LAA cells of the SCG needs to be reported.

3. The UE of claim 2, wherein if only LAA cells of the SCG need to be reported in a subframe, then the instructions are further executable to:

determine the licensed cell is used for UCI reporting if the LAA PDSCH is cross-carrier scheduled from the licensed cell; and determine the LAA cell is used for UCI reporting if the LAA PDSCH is self-scheduled or cross-carrier scheduled from another LAA cell in the same cell group (CG).

4. The UE of claim 1, wherein when at least one PDSCH is received on at least one LAA serving cell in the SCG with an LAA cell as the pSCell, the instructions are further executable to determine transmission timing for HARQ-ACK feedback for the LAA PDSCH, and wherein the instructions executable to determine the transmission timing for the HARQ-ACK feedback for the LAA PDSCH comprise instructions executable to:

determine the starting subframe where the HARQ-ACK feedback of the received PDSCH can be reported; and determine the allowed UCI transmission range where the HARQ-ACK feedback of the received PDSCH can be reported.

5. The UE of claim 4, wherein the instructions executable to determine the transmission timing for the HARQ-ACK feedback for the LAA PDSCH comprise instructions executable to:

determine the starting subframe and the allowed UCI transmission range by a fixed value or higher layer signaling.

6. The UE of claim 4, wherein the instructions executable to determine the transmission timing for the HARQ-ACK feedback for the LAA PDSCH comprise instructions executable to:

determine the starting subframe and the allowed UCI transmission range by a downlink scheduling downlink control information (DCI).

7. The UE of claim 1, wherein the instructions are further executable to determine content of HARQ-ACK feedback for the LAA PDSCH in a potential uplink (UL) LAA UCI reporting subframe, and wherein the HARQ-ACK feedback of each LAA downlink (DL) subframe is generated and reported independently following a determined transmission timing and range.

8. The UE of claim 1, wherein the instructions are further executable to determine content of HARQ-ACK feedback for the LAA PDSCH in a potential uplink (UL) LAA UCI reporting subframe, and wherein the HARQ-ACK feedback of each LAA downlink (DL) subframe is generated and aggregated together in a single HARQ-ACK report based on a determined transmission timing and range.

9. The UE of claim 1, wherein the instructions are further executable to determine content of HARQ-ACK feedback for the LAA PDSCH in a potential uplink (UL) LAA UCI reporting subframe, and wherein the HARQ-ACK feedback of a set of LAA downlink (DL) subframes is generated and aggregated together and associated with a single UCI transmission start time and range.

10. The UE of claim 1, wherein the instructions are further executable to determine timing and content of HARQ-ACK feedback for the LAA PDSCH in a potential uplink (UL) LAA UCI reporting subframe, and wherein:

the HARQ-ACK feedback is initiated after a fixed or predefined association timing if at least one PDSCH is received on the LAA cell; and the HARQ-ACK of all HARQ-ACK processes is reported in a UCI transmission subject to the channel access procedure.

11. A method for uplink control information (UCI) reporting with license-assisted access (LAA) uplink transmissions, the method being implemented by a user equipment (UE), the method comprising:

configuring the UE with a secondary cell group (SCG);

configuring the UE with an LAA serving cell as a primary secondary cell (pSCell) of the SCG;

receiving a physical downlink shared channel (PDSCH) on at least one LAA serving cell in the SCG;

determining a channel to carry the UCI, the channel being on a serving cell in the SCG;

determining transmission timing of the channel based on reception timing of the received PDSCH, wherein the transmission timing comprises a starting subframe and an allowed UCI transmission range when an LAA is used for UCI reporting;

determining one or more PDSCHs of which hybrid automatic repeat request acknowledgment (HARQ-ACK) bits are included in the UCI, the one or more PDSCHs including the received PDSCH;

determining content of the HARQ-ACK bits; and performing a channel access procedure for transmission of the channel.

12. The method of claim 11, wherein when at least one PDSCH is received on at least one LAA serving cell in the SCG with an LAA cell as the pSCell, determining the channel to carry the UCI comprises:

determining a licensed cell is used for UCI reporting if a UCI of both licensed and LAA cells needs to be reported; and determining the LAA cell is used for UCI reporting if a UCI of only LAA cells of the SCG needs to be reported.

13. The method of claim 12, wherein if only LAA cells of the SCG need to be reported in the subframe, then the method further comprises:

determining the licensed cell is used for UCI reporting if the LAA PDSCH is cross-carrier scheduled from the licensed cell; and determining the LAA cell is used for UCI reporting if the LAA PDSCH is self-scheduled or cross-carrier scheduled from another LAA cell in the same cell group (CG).

14. The method of claim 11, wherein when at least one PDSCH is received on at least one LAA serving cell in the SCG with an LAA cell as the pSCell, the method further comprises determining transmission timing for HARQ-ACK feedback for the LAA PDSCH, and wherein determining the transmission timing for the HARQ-ACK feedback for the LAA PDSCH comprises:
   determining the starting subframe where the HARQ-ACK feedback of the received PDSCH can be reported; and
   determining the allowed UCI transmission range where the HARQ-ACK feedback of the received PDSCH can be reported.

15. The method of claim 14, wherein determining the transmission timing for the HARQ-ACK feedback for the LAA PDSCH comprises:
   determining the starting subframe and the allowed UCI transmission range by a fixed value or higher layer signaling.

16. The method of claim 14, wherein determining the transmission timing for the HARQ-ACK feedback for the LAA PDSCH comprises:
   determining the starting subframe and the allowed UCI transmission range by a downlink scheduling downlink control information (DCI).

17. The method of claim 11, further comprising determining content of HARQ-ACK feedback for the LAA PDSCH in a potential uplink (UL) LAA UCI reporting subframe, wherein the HARQ-ACK feedback of each LAA downlink (DL) subframe is generated and reported independently following a determined transmission timing and range.

18. The method of claim 11, further comprising determining content of HARQ-ACK feedback for the LAA PDSCH in a potential uplink (UL) LAA UCI reporting subframe, wherein the HARQ-ACK feedback of each LAA downlink (DL) subframe is generated and aggregated together in a single HARQ-ACK report based on a determined transmission timing and range.

19. The method of claim 11, further comprising determining content of HARQ-ACK feedback for the LAA PDSCH in a potential uplink (UL) LAA UCI reporting subframe, wherein the HARQ-ACK feedback of a set of LAA downlink (DL) subframes is generated and aggregated together and associated with a single UCI transmission start time and range.

20. The method of claim 11, further comprising determining timing and content of HARQ-ACK feedback for the LAA PDSCH in a potential uplink (UL) LAA UCI reporting subframe, wherein:
   the HARQ-ACK feedback is initiated after a fixed or predefined association timing if at least one PDSCH is received on the LAA cell; and
   the HARQ-ACK of all HARQ-ACK processes is reported in a UCI transmission subject to the channel access procedure.

* * * * *